US012693393B2

(12) United States Patent
Ogawa

(10) Patent No.: US 12,693,393 B2
(45) Date of Patent: Jul. 28, 2026

(54) CONTROL APPARATUS, OPTICAL APPARATUS, OPTICAL SYSTEM, ON-BOARD SYSTEM, MOVING APPARATUS, CONTROL METHOD, AND STORAGE MEDIUM

(71) Applicant: CANON KABUSHIKI KAISHA, Tokyo (JP)

(72) Inventor: Takeshi Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 18/415,128

(22) Filed: Jan. 17, 2024

(65) Prior Publication Data

US 2024/0255621 A1 Aug. 1, 2024

(30) Foreign Application Priority Data

Jan. 27, 2023 (JP) ................................. 2023-010750

(51) Int. Cl.
| | |
|---|---|
| *G01S 7/4865* | (2020.01) |
| *B60Q 9/00* | (2006.01) |
| *B60T 7/22* | (2006.01) |
| *G01S 7/484* | (2006.01) |
| *G01S 17/931* | (2020.01) |

(52) U.S. Cl.
CPC ............ *G01S 7/4865* (2013.01); *B60Q 9/008* (2013.01); *B60T 7/22* (2013.01); *G01S 7/484* (2013.01); *G01S 17/931* (2020.01)

(58) Field of Classification Search
CPC ...... G01S 7/4865; G01S 7/484; G01S 17/931; B60Q 9/008; B60T 7/22
See application file for complete search history.

(56) References Cited

U.S. PATENT DOCUMENTS

2023/0138429 A1* 5/2023 Kawakami ............ G01S 17/931
701/70

FOREIGN PATENT DOCUMENTS

| | | | | |
|---|---|---|---|---|
| CN | 110537124 A | * 12/2019 | ........... | G01S 7/4816 |
| JP | 2022-531578 A | 7/2022 | | |
| WO | 2020/223561 A1 | 11/2020 | | |

OTHER PUBLICATIONS

CN110537124A translated (Year: 2019).*

* cited by examiner

*Primary Examiner* — James J Lee
*Assistant Examiner* — Brandon S Lee
(74) *Attorney, Agent, or Firm* — Cowan, Liebowitz & Latman, P.C.

(57) ABSTRACT

A control apparatus is configured to control an optical apparatus that acquires distance information to an object and includes a light emitter configured to emit to the object pulsed light at a plurality of emission intervals set to be at unequal time intervals, and a light receiver configured to detect the pulsed light reflected by the object. The control apparatus acquires first and second measurement times, and acquires flight time of the pulsed light from when the pulsed light is emitted to when the pulsed light is detected by the light receiver based on a plurality of first data obtained by adding a plurality of first offsets based on the plurality of emission intervals to the first measurement time, and a plurality of second data obtained by adding a plurality of second offsets based on the plurality of emission intervals to the second measurement time.

20 Claims, 11 Drawing Sheets

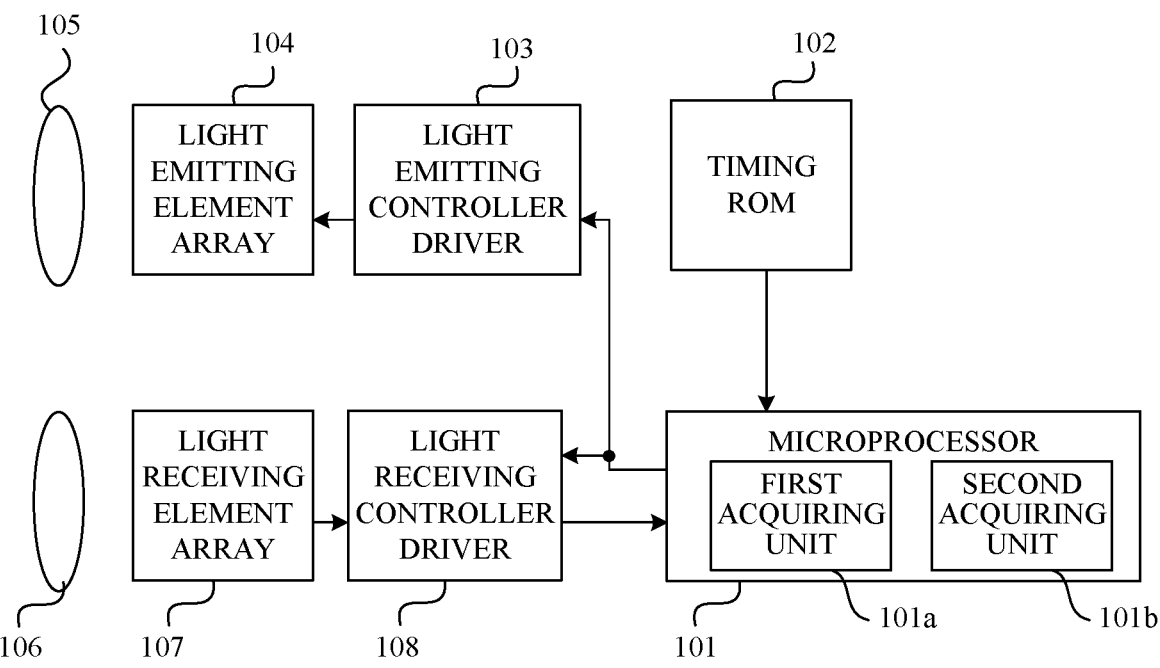
FIG. 1
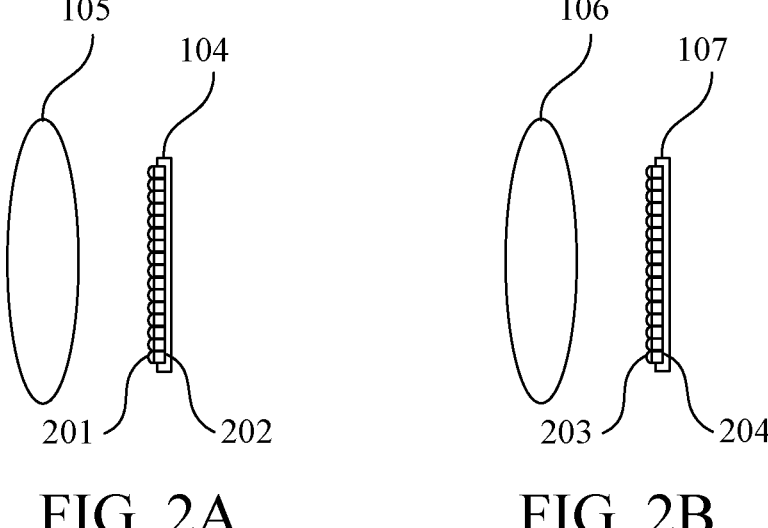
FIG. 2A                    FIG. 2B

1000

1                                              200

OPTICAL APPARATUS    ←    VEHICLE INFORMATION ACQUIRING APPARATUS 300                                            400

CONTROL APPARATUS          ALERT APPARATUS

1000 ON-BOARD SYSTEM

500 VEHICLE

1 OPTICAL APPARATUS

MEASURABLE RANGE

VEHICLE INFORMATION ACQUIRING APPARATUS

CONTROL APPARATUS

ALERT APPARATUS 200                300                400

CONTROL APPARATUS, OPTICAL APPARATUS, OPTICAL SYSTEM, ON-BOARD SYSTEM, MOVING APPARATUS, CONTROL METHOD, AND STORAGE MEDIUM

BACKGROUND

Technical Field

One of the aspects of the embodiments relates to a control apparatus, an optical apparatus, an optical system, an on-board system, a moving apparatus, a control method, and a storage medium.

Description of Related Art

The conventional Light Detection and Ranging (LIDAR) is configured to reduce the influence of crosstalk from other pulsed light sources in a case where a plurality of LIDARs are operating in the same space (see PCT Domestic Publication No. 2022-531578).

However, the configuration disclosed in PCT Domestic Publication No. 2022-531578 needs a jitter time in addition to flight time of the pulsed light from an emission timing of a pulsed light source to a reception timing of reflected light from the object, and it becomes difficult to improve a frame rate and an SN ratio.

SUMMARY

A control apparatus according to one aspect of the embodiment is configured to control an optical apparatus that acquires distance information to an object and includes a light emitter configured to emit to the object pulsed light at a plurality of emission intervals set to be at unequal time intervals, and a light receiver configured to detect the pulsed light reflected by the object. The control apparatus includes a memory storing instructions, and a processor configured to execute the instructions to acquire first measurement time from a first timing when the light receiver is set to a detectable state to a second timing when the light receiver detects the pulsed light, and second measurement time from a third timing when the light receiver is set to a detectable state to a fourth timing when the light receiver detects the pulsed light, and acquire flight time of the pulsed light from when the pulsed light is emitted to when the pulsed light is detected by the light receiver. The processor acquires the flight time based on a plurality of first data obtained by adding a plurality of first offsets based on the plurality of emission intervals to the first measurement time, and a plurality of second data obtained by adding a plurality of second offsets based on the plurality of emission intervals to the second measurement time. An optical apparatus, an optical system, an on-board system, a moving apparatus, each having the above control apparatus also constitute another aspect of the embodiment. A control method corresponding to the above control apparatus also constitutes another aspect of the embodiment. A storage medium storing a program that causes a computer to execute the above control method also constitutes another aspect of the embodiment.

Further features of the disclosure will become apparent from the following description of embodiments with reference to the attached drawings.

BRIEF DESCRIPTION OF THE DRAWINGS

FIG. 1 is a block diagram of LIDAR according to a first embodiment.

FIGS. 2A and 2B are sectional views of a light emitting element array and a light receiving element array.

DESCRIPTION OF THE EMBODIMENTS

Figure 3:
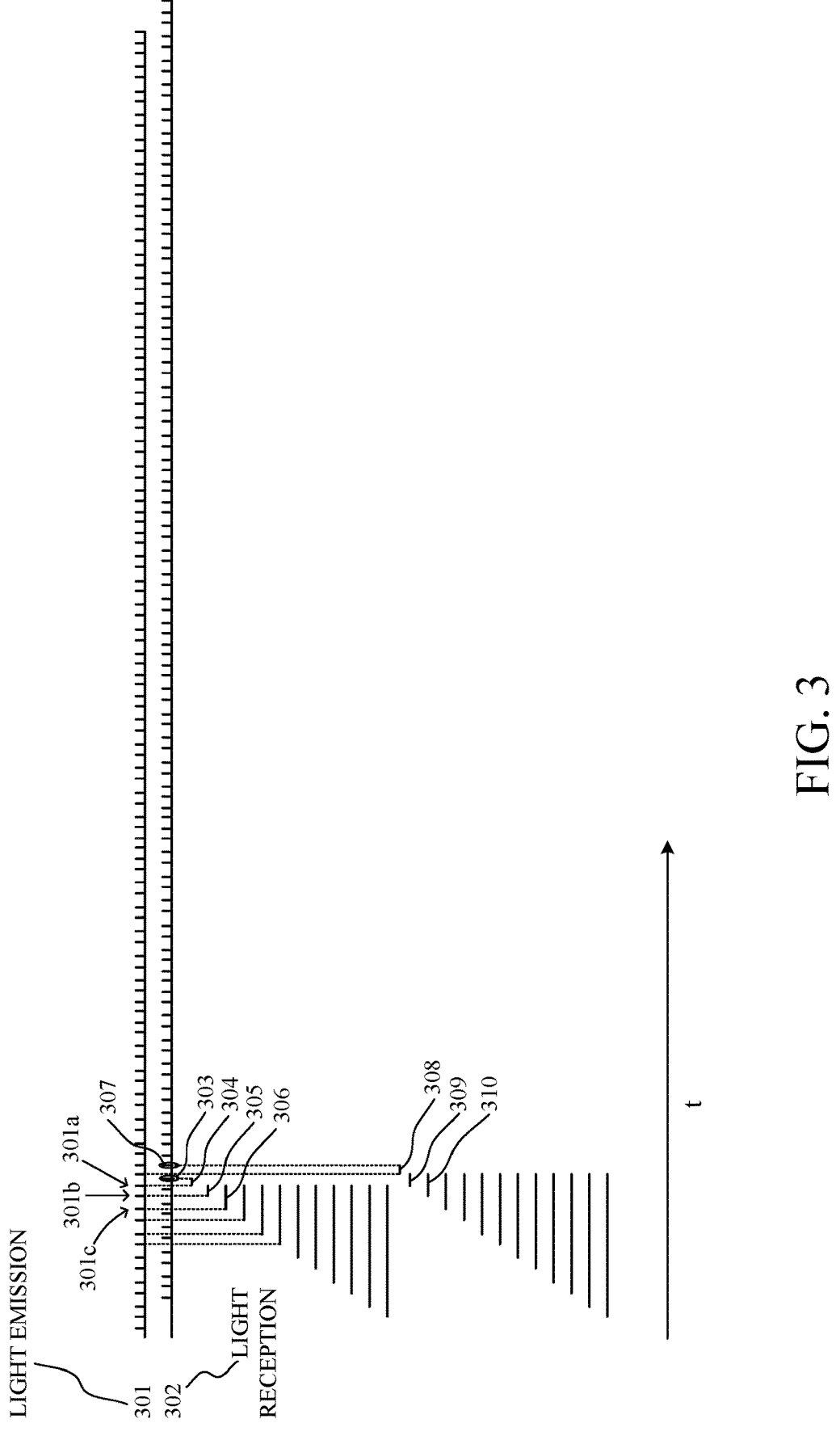
FIG. 3 is a timing chart illustrating light emitting timing and light receiving timing.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a block diagram of Light Detection and Ranging (LIDAR) as an optical apparatus according to this embodiment. FIGS. 2A and 2B are sectional views of a light emitting element array 104 and a light receiving element array 107, respectively.

The LIDAR includes a microprocessor 101, a timing ROM (memory) 102, a light emitting controller driver 103, the light emitting element array 104, an optical system 105, an imaging optical system 106, the light receiving element array 107, and a light receiving controller driver 108. The LIDAR can acquire distance information to an object (target).

The microprocessor 101 controls the entire LIDAR. The timing ROM 102 stores a table of light emitting intervals and offsets of light emitting elements, which will be described below. The light emitting controller driver 103 drives the light emitting element array 104 at a specified timing. The light emitting element array 104 is formed by vertically and horizontally arranging a plurality of microlenses 201 and light emitting elements 202, and has a functions as a light emitter that emits pulsed light at a plurality of light emitting intervals (emission intervals) set at unequal time intervals for the object. The light emitting element array 104 uses, for example, a near-infrared (NIR) vertical cavity semiconductor laser (VCSEL), etc. The optical system 105 irradiates the object with the pulsed light emitted from the light emitting element array 104. The imaging optical system 106 forms an image of reflected light from the object onto the light receiving element array 107. The light receiving element array 107 is formed by vertically and horizontally arranging a plurality of microlenses 203 and light receiving elements 204, and functions as a light receiver that receives (detects) the reflected light from an object. The light receiving element array 107 is sensitive to the wavelength of the pulsed light emitted from the light emitting element array 104. The light receiving element array 107 can detect a measurement time (light receiving time) from when the light receiving element 204 is reset to when the reflected light from the object is first received after the light receiving element 204 is reset. Resetting the light receiving elements 204 means setting the light receiving element array 107 to a detectable state. The light receiving controller driver 108 drives the light receiving element array 107. The light emitting controller driver 103 and the light receiving controller driver 108 synchronously operate, and start light emission and start light reception at the same timing (simultaneously).

The microprocessor 101 includes a first acquiring unit 101a and a second acquiring unit 101b. The first acquiring unit 101a acquires a plurality of measurement times (first measurement time and second measurement time) from the light receiving element array 107. The first measurement time is a period from a first timing at which the light receiving element array 107 is set to the detectable state to a second timing at which it first receives the reflected light from the object after the first timing. The second measurement time is a period from a third timing at which the light receiving element array 107 is set to the detectable state to a fourth timing at which it first receives the reflected light from the object after the third timing. The first timing and the third timing are different timings. Similarly, the second timing and the fourth timing are different timings. The second acquiring unit 101b acquires the flight time (traveling time) of the pulsed light from when the pulsed light is emitted to when it is reflected by the object and detected by the light receiving element array 107. The second acquiring unit 101b acquires the flight time based on a plurality of data obtained by adding a plurality of offsets (a first offset and a second offset) based on a plurality of light emitting intervals for each of a plurality of measurement times, as described below. The first offset is an offset added to the first measurement time, and the second offset is an offset added to the second measurement time. Although the microprocessor 101 is installed in the LIDAR in this embodiment, it may be configured as a control apparatus separate from the LIDAR. In this case, the control apparatus may include the timing ROM 102.

FIG. 3 is a timing chart illustrating a light emitting timing and a light receiving timing. In FIG. 3, the horizontal axis represents elapsed time. Reference numeral 301 denotes the timing at which the light emitting element 202 emits light. Reference numeral 302 denotes the timing at which the light receiving element 204 receives light. When the light emitting element 202 emits light at timing 301a and the light receiving element 204 receives light at timing 303, time (period) 304 is the flight time (period) from the light emitting timing of the light emitting element 202 to the light receiving timing of the light receiving element 204. Nevertheless, in this embodiment, light is emitted at a shorter cycle than the flight time determined by the measurable distance. Therefore, the light emitting timing of the light emitting element 202 can be the timing 301b, and the flight time can be a sum of the time 304 and second offset 305. The second offset 305 corresponds to the time interval between the timings 301a and 301b, that is, the light emitting (time) interval of the light emitting element 202. If the light emitting element 202 emits light at timing 301c, and the flight time becomes a sum of the time 304 and third offset 306. The third offset 306 is a sum of the offset 305 and the interval between the timings 301b and 301c, that is, the light emitting interval of the light emitting element 202, and corresponds to two light emitting intervals. In FIG. 3, since the light receiving element 204 is reset at the timing 301a at the timing 303, only the time 304 is actually measured as the measurement time.

This embodiment prepares N (N is a natural number) offsets, i.e., first to Nth offsets (0 to N light emitting intervals) for the flight time corresponding to the measurable distance, and aggregates, as a histogram, data (candidate flight time) by adding the measurement time to all offsets. The first offset is equal to 0 corresponding 0 light emitting interval. For example, for eight offsets, i.e., first to seventh offsets (0 to 7 light emitting intervals), eight candidate flight times are aggregated as a histogram. The required sampling number is completed in eight times the time, and the likelihood of the timing interference with another LIDAR can be reduced.

Reference numeral 307 denotes the next timing after timing 302 in a case where the light receiving element 204 receives light. The measurement time is time 308. In this embodiment, the time 308 is different from the time 304 because the light emitting interval of the light emitting element 202 and the reset interval of the light receiving element 204 are different. Since the light emitting intervals of the light emitting elements 202 are different, second offset 309 and third offset 310 are also different from the second offset 305 and the third offset 306, respectively. Thus, a different offset for each light reception is added and recorded in the histogram. In the light emitting element array 104 and the light receiving element array 107, the light emitting element 202 and the light receiving element 204 are arranged two-dimensionally, so the same thing is done for each element.

Figure 4:
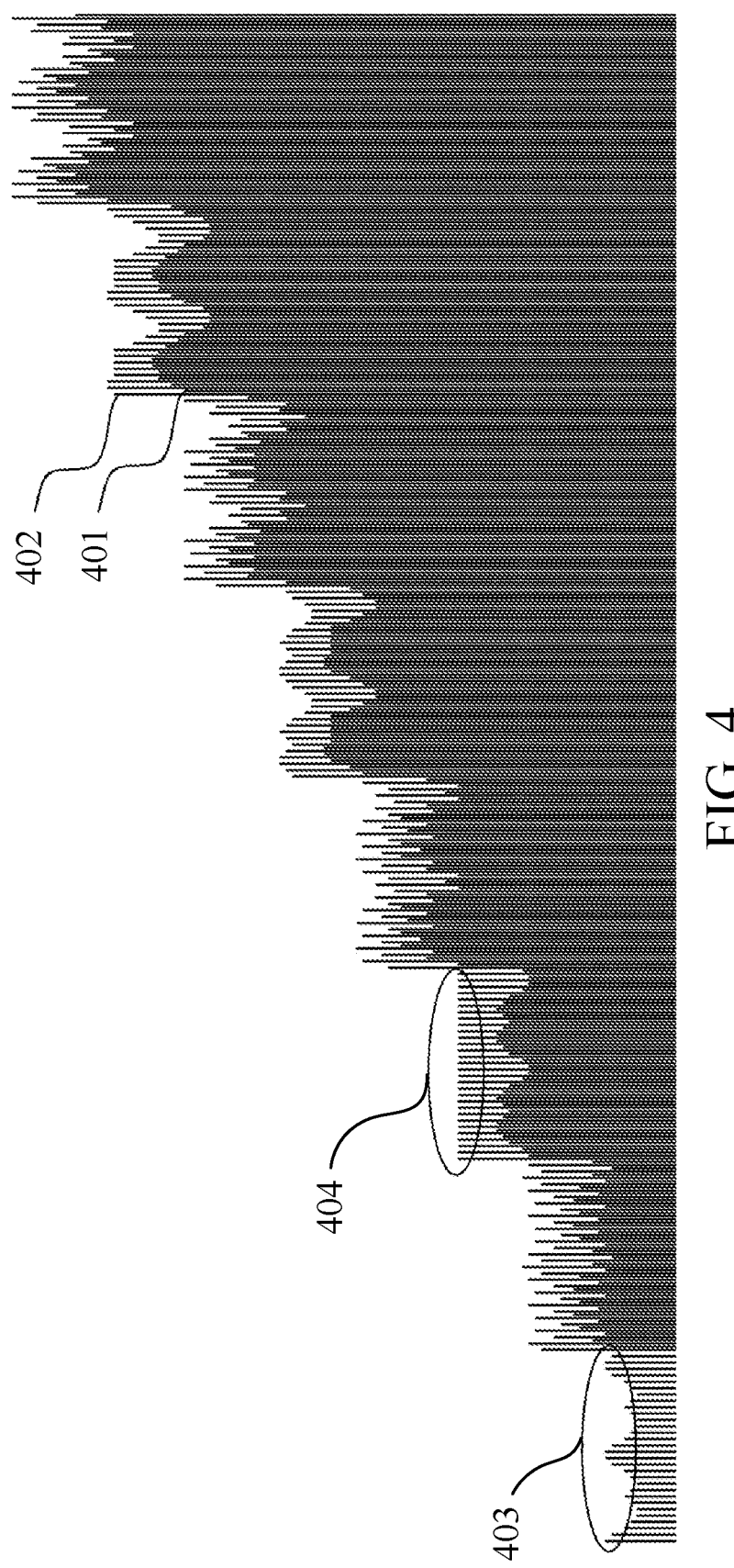
FIG. 4 illustrates offsets and candidate flight times.

FIG. 4 illustrates the offsets and the candidate flight times obtained by adding the offset to the measurement time. In FIG. 4, the vertical axis indicates time. Reference numeral 401 denotes an offset. Reference numeral 402 denotes a candidate flight time obtained by adding the offset to the measurement time. The offset corresponds to 0 to 7 light emitting intervals from the left side of FIG. 4. In data indicated by 403 corresponds to zero (or no) offsets, that is, the measurement time itself, but the values scatter. On the other hand, a plurality of data indicated by 404 have different offsets, but the candidate flight times obtained by adding the offsets to the measurement time are equal. The offsets added at this time are the correct offsets, and the other offsets are false offsets.

Figure 5:
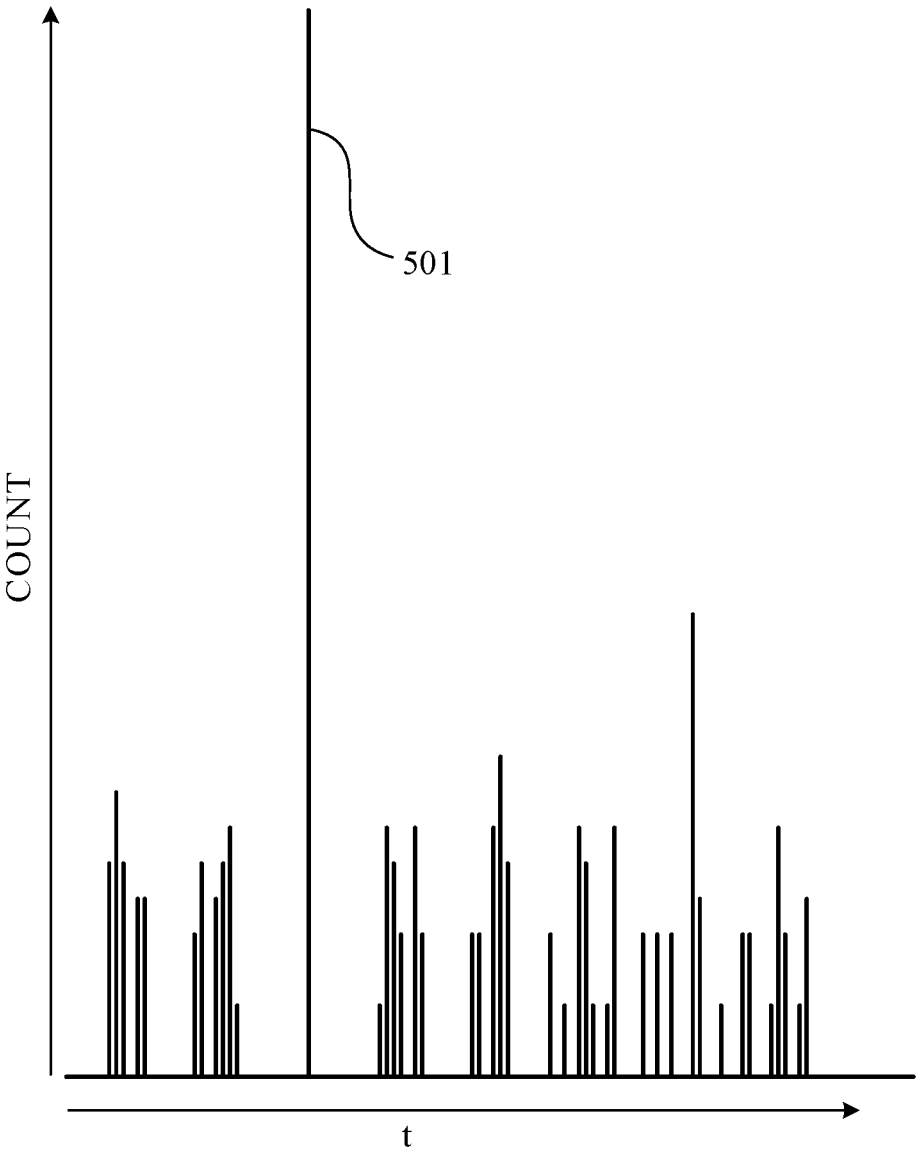
FIG. 5 is a histogram graph of the candidate flight times in FIG. 4.

FIG. 5 is a graph illustrating a histogram of candidate flight times obtained by adding offsets to the measurement time illustrated in FIG. 4. In FIG. 5, the horizontal axis indicates the candidate flight time, and the vertical axis indicates the number of counts. Reference numeral 501 with the largest number of counts is the candidate flight time obtained by adding the correct offset to the measured time. Thus, by creating the histogram of all the candidate flight times obtained by adding the offsets to the measurement time, only those to which the correct offsets have been added can be extracted. This embodiment converts all candidate flight times into a histogram, but this embodiment is not limited to this example as long as the candidate flight time can be acquired with the correct offset added, that is, the candidate flight time with the largest number.

Figure 6:
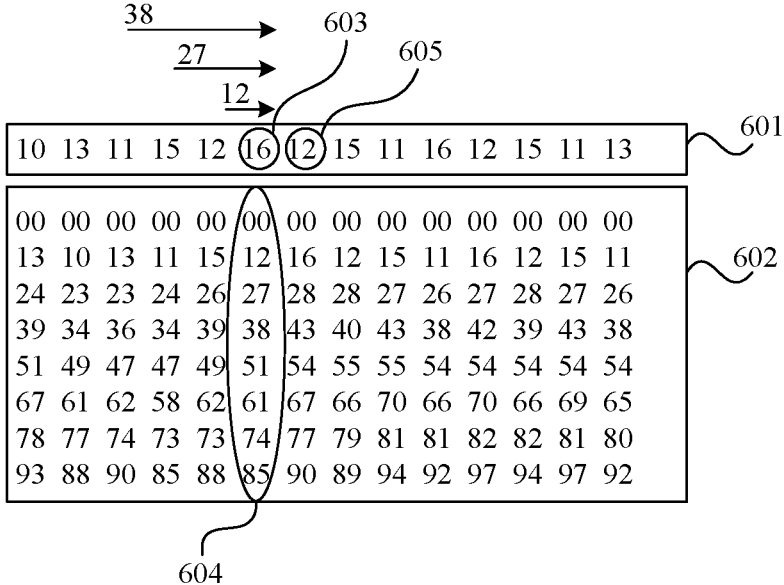
FIG. 6 is a table of light emitting intervals and offsets.

FIG. 6 is a table of light emitting intervals and offsets stored in the timing ROM 102. Reference numeral 601 denotes a table of light emitting intervals [ns]. Reference numeral 602 denotes a table of offsets [ns]. The pulsed light emitted from the light emitting element array 104 has a speed of 29.98 cm/ns and travels back and forth between the LIDAR and the object, so the resolution (light traveling speed from the LIDAR to the object) becomes 14.99 [cm/ns]. For example, in a case where the light receiving element 204 is reset and the light emitting element 202 emits light at timing 603, the light emitting interval until the next reset and light emission is controlled to be 16 ns. Offset column 604 corresponds to timing 603. After the light receiving element 204 is reset at the timing 603, the offsets in the offset column 604 are added to the measurement time measured up to timing 605. For example, at the timing 603, 12 ns has passed since the light emission before the timing 603, so the second offset is 12 ns, and since 27 ns has passed since the previous light emission, the third offset is 27 ns. Similarly, the fourth offset is 38 ns. In a case where the light emitting interval and offset tables are used to the end, they can be used in a loop from the beginning, so a table shorter than the number of continuous light emissions may be used. In configuring an optical system that includes a plurality of LIDARs according to this embodiment, creating a table having a different interval time combination for each LIDAR can suppress interference even if other LIDARs operate in the same space.

Figure 7:
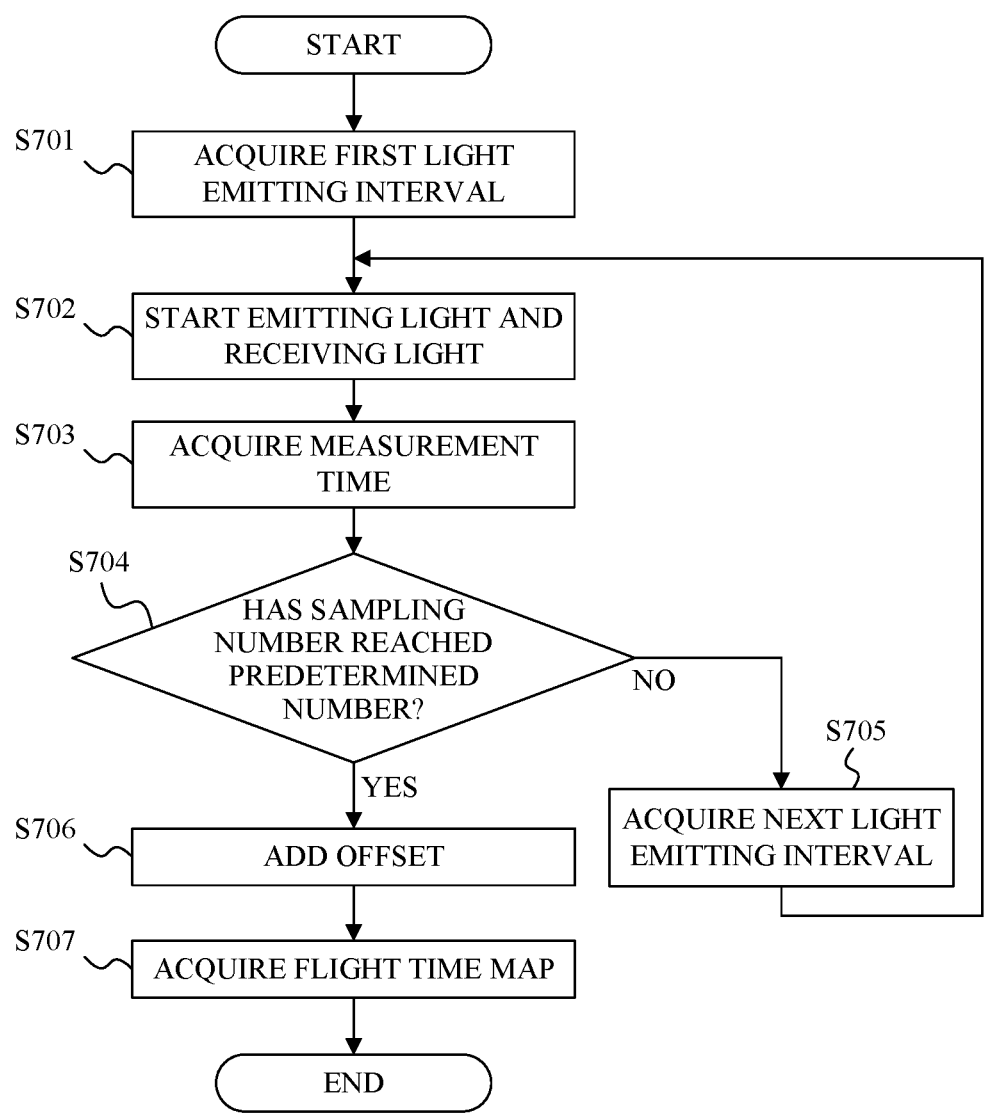
FIG. 7 is a flowchart illustrating a method for generating a flight time map according to a first embodiment.

FIG. 7 is a flowchart illustrating a method for generating a flight time map generation method executed by the microprocessor 101 according to this embodiment.

In step S701, the microprocessor 101 refers to the timing ROM 102 and acquires the first light emitting interval in the tables of the light emitting intervals and offsets.

In step S702, the microprocessor 101 causes the light emitting element array 104 to start emitting light, and resets the light receiving element array 107 to start receiving light.

In step S703 (first step), the microprocessor 101 (first acquiring unit 101*a*) acquires the measurement time from the light receiving element array 107 until the light emitting interval has elapsed. The light receiving element array 107 can detect a plurality of measurement times during a single light receiving period. In this embodiment, the microprocessor 101 performs offset addition and histogram generation for all acquired measurement times.

In step S704, the microprocessor 101 determines whether the number of samplings has reached a predetermined number. In a case where the microprocessor 101 determines that the number of samplings has reached the predetermined number of times, it executes the process of step S706, and in a case where it determines that the number of samplings has not reached the predetermined number of times, it executes the process of step S705.

In step S705, the microprocessor 101 refers to the timing ROM 102 and acquires the next light emitting interval from the tables of the light emitting interval and offset.

In step S706, the microprocessor 101 adds an offset corresponding to the measurement time obtained from the timing ROM 102 to the obtained measurement time, and adds the calculated data to the histogram. In this embodiment, the microprocessor 101 performs this step until the data obtained by adding all the offsets corresponding to the measurement times to the measurement times obtained for each pixel on the light receiving element array 107 are added to the histogram in all sampling periods. During the sampling period, a plurality of measurement times can be detected or no measurement time can be detected. If no measurement time is detected, no data is added to the histogram.

In step S707 (second step), the microprocessor 101 acquires a two-dimensional flight time map by acquiring a peak of the histogram (such as 501 in FIG. 5), that is, the correct flight time, for each pixel. The distance map is obtained by multiplying the flight time map by the light traveling speed from the LIDAR to the object (=14.99 [cm/ns]).

As described above, this embodiment emits light from the light emitting element array 104 and resets the light receiving element array 107 at the light emitting intervals as unequal time intervals, and generates a histogram by adding a plurality of offsets to the measurement time. Thereby, this embodiment can reduce the influence of crosstalk from the pulsed light sources of other LIDARs. In addition, this embodiment can perform sampling at intervals shorter than the flight time determined by the measurable distance, thus can reduce the time required to perform a predetermined number of samplings, and can suppress interference of light emissions with other pulsed light sources of other LIDARs.

Second Embodiment

The LIDAR configuration according to this embodiment is the same as that of the first embodiment, and a description will be omitted in this embodiment. This embodiment will discuss only a configuration different from that of the first embodiment, and omit a description of the same configuration.

The timing ROM 102 previously stores the tables of the light emitting intervals and offsets in the first embodiment, but this embodiment generates these tables at random on a real-time basis by a random number generator. The random number generator may or may not be included in microprocessor 101. In a case where a difference between the minimum value (shortest distance) and the maximum value (longest distance) of the measurable distance is large, the flight time becomes long, thus the LIDAR operation interval also becomes long, and more processing can be performed during the light emitting interval.

Figure 8:
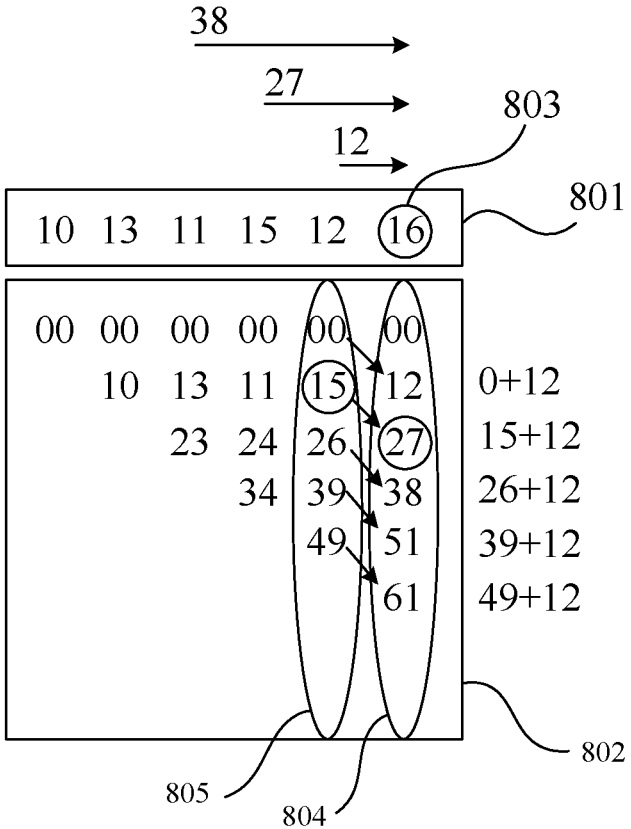
FIG. 8 is a table of offsets based on the random number generation history in a second embodiment.

FIG. 8 explains a method for generating a table of light emitting intervals and offsets in this embodiment. Reference numeral 801 denotes a table of a light emitting interval (random number history) generated by a random number generator. Reference numeral 802 denotes an offset column corresponding to the light emitting interval 801. For example, in generating offset column 804 corresponding to light emitting interval 803, 0 is first inserted into the top. Next, a value obtained by adding the just previous light emitting interval (=12) is added to the offset at the top of the just previous offset column 805 is inserted into a position next to the top of the offset column 804. The offset column 804 can be generated on a real-time basis by adding the previous light emitting interval (=12) to all offsets in the offset column 805 and sequentially inserting it into corresponding positions in the offset column 804. This configuration can generate a table that is not repetitive, and thus further reduce the influence of crosstalk from the pulsed light source of another LIDAR.

Figure 9:
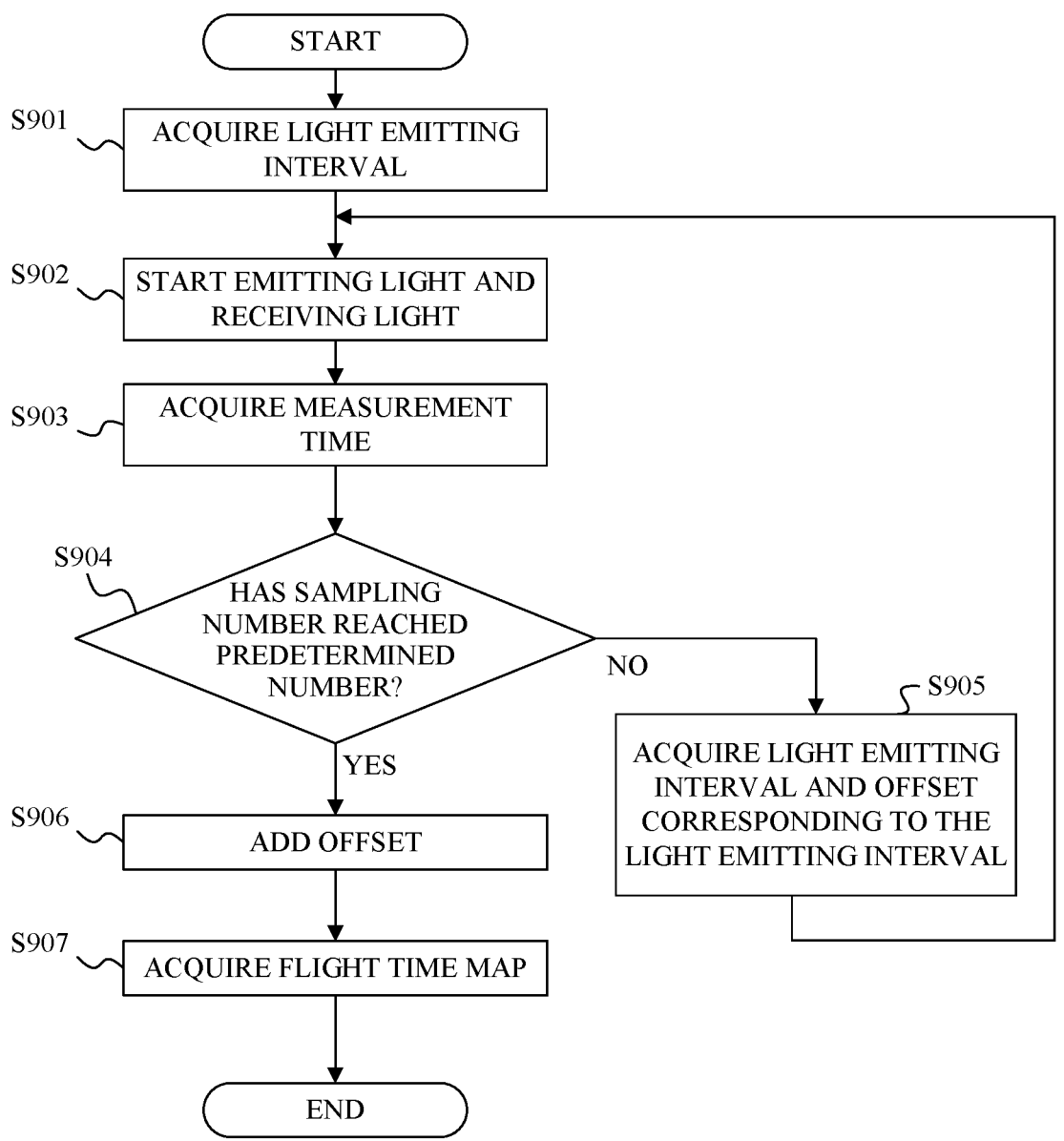
FIG. 9 is a flowchart illustrating a method for generating a flight time map according to the second embodiment.

FIG. 9 is a flowchart illustrating a method of generating a flight time map executed by the microprocessor 101 according to this embodiment.

In step S901, the microprocessor 101 acquires a light emitting interval generated by the random number generator.

Steps S902 to S904 correspond to steps S702 to S704 in FIG. 7, respectively, and a description thereof will be omitted.

In step S905, the microprocessor 101 acquires the light emitting interval generated (updated) by the random number generator and the offset corresponding to the light emitting interval.

Steps S906 and S907 correspond to steps S706 and S707 in FIG. 7, respectively, and a description thereof will be omitted.

Third Embodiment

The LIDAR configuration according to this embodiment is the same as that of the first embodiment, and a description thereof will be omitted in this embodiment. This embodiment will discuss only a configuration different from that of the first embodiment, and omit a description of the same configuration.

Figure 10:
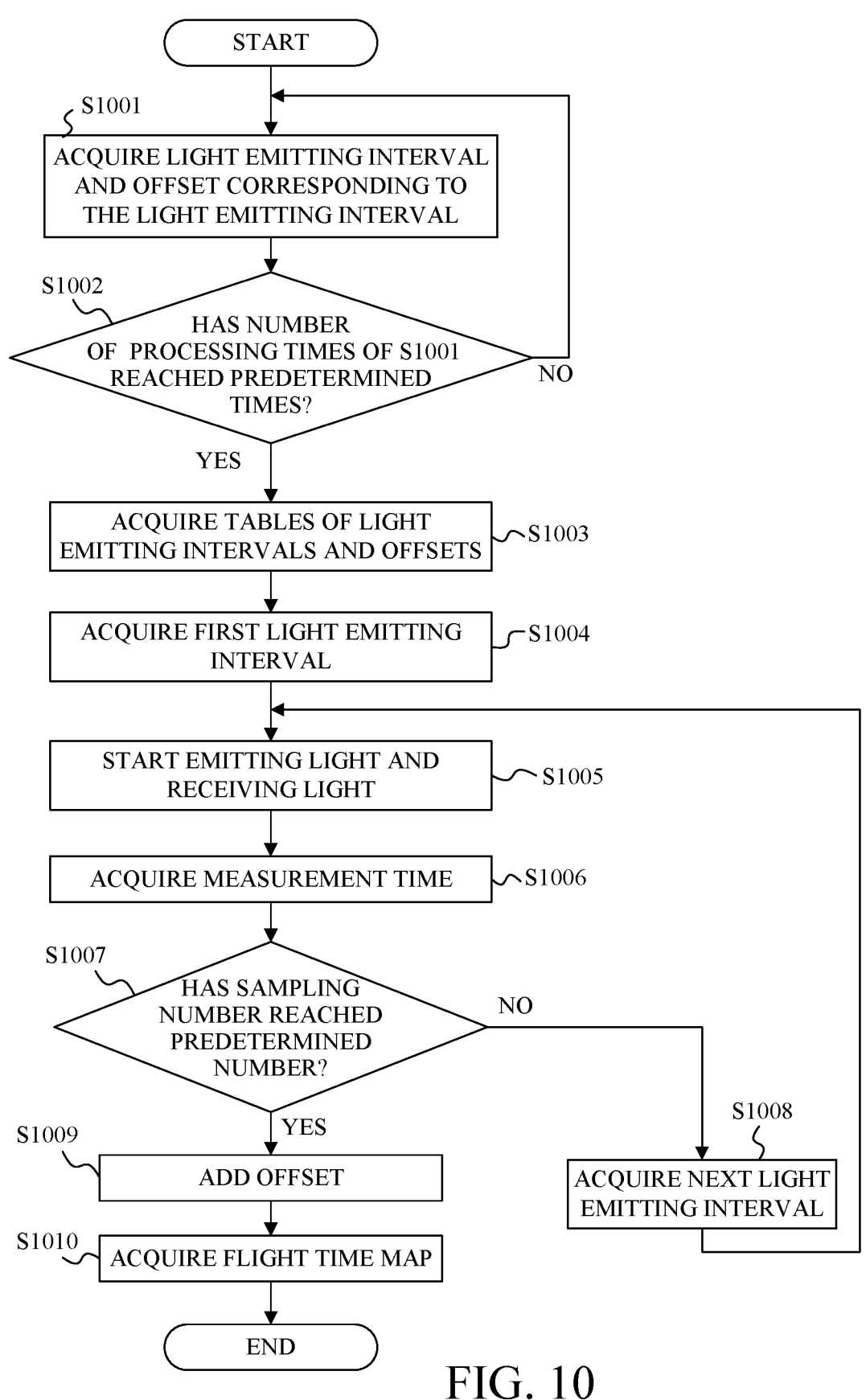
FIG. 10 is a flowchart illustrating a method for generating a flight time map according to a third embodiment.

FIG. 10 is a flowchart illustrating a method of generating a flight time map executed by the microprocessor 101 according to this embodiment.

In step S1001, the microprocessor 101 acquires a light emitting interval generated by a random number generator and an offset corresponding to the light emitting interval.

In step S1002, the microprocessor 101 determines whether the number of processing times of step S1001 has reached a predetermined number. In a case where the microprocessor 101 determines that the number of processing times of step S1001 has reached the predetermined number, it executes the processing of step S1003, and in a case where the microprocessor 101 determines that the number of processing times of step S1001 has not reached the predetermined number of times, it executes the processing of step S1001.

In step S1003, the microprocessor 101 acquires the tables of the light emitting intervals and offsets. That is, unlike the second embodiment, this embodiment previously prepares the tables of the light emitting intervals and offsets.

Steps S1004 to S1010 correspond to steps S701 to S707 in FIG. 7, respectively, and a description thereof will be omitted.

On-Board System (In-Vehicle System)

Figure 11:
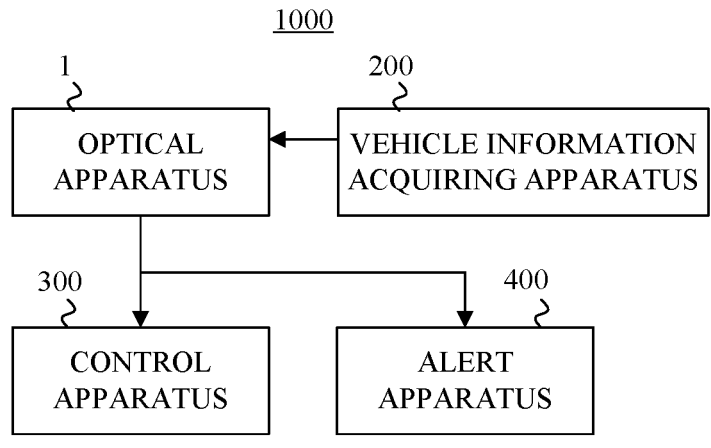
FIG. 11 is a configuration diagram of an on-board system according to this embodiment.
Figure 12:
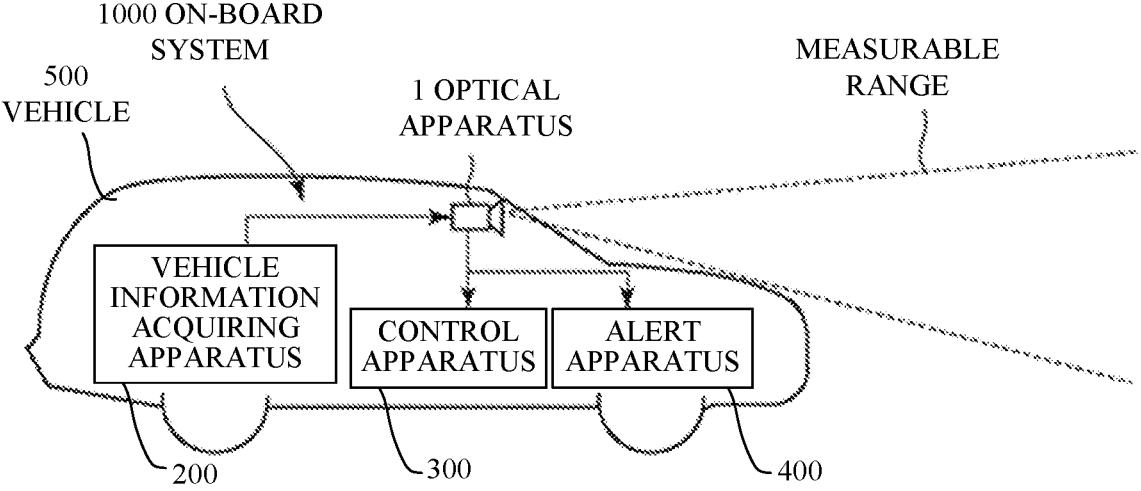
FIG. 12 is a schematic diagram of a moving apparatus according to this embodiment.

FIG. 11 illustrates a configuration of the optical apparatus 1 according to this embodiment and an on-board system (driving support apparatus) 1000 including the optical apparatus 1. The on-board system 1000 is an apparatus held by a movable body (moving apparatus such as an automobile, a vehicle, and a drone), and configured to support the driving (control) of the vehicle based on distance information to the object such as an obstacle or a pedestrian around the vehicle acquired by the optical apparatus 1. FIG. 12 schematically illustrates a moving apparatus (referred to as a vehicle hereinafter) 500 including an on-board system 1000. Although the distance measuring range (detecting range) of the optical apparatus 1 is set to the front of the vehicle 500 in FIG. 12, the distance measuring range may be set to the back or side of the vehicle 500.

As illustrated in FIG. 11, the on-board system 1000 includes an optical apparatus 1, a vehicle information acquiring apparatus 200, a control apparatus (ECU: electronic control unit) 300, and an alert apparatus 400. In the on-board system 1000, the control unit included in the optical apparatus 1 serves as a distance acquiring unit and a collision determining unit. If necessary, the on-board system 1000 may be provided with a distance acquiring unit and a collision determining unit that are separate from the control unit, or may be provided outside the optical apparatus 1 (for example, inside the vehicle 500). Alternatively, the control apparatus 300 may be used as the control unit.

Figure 13:
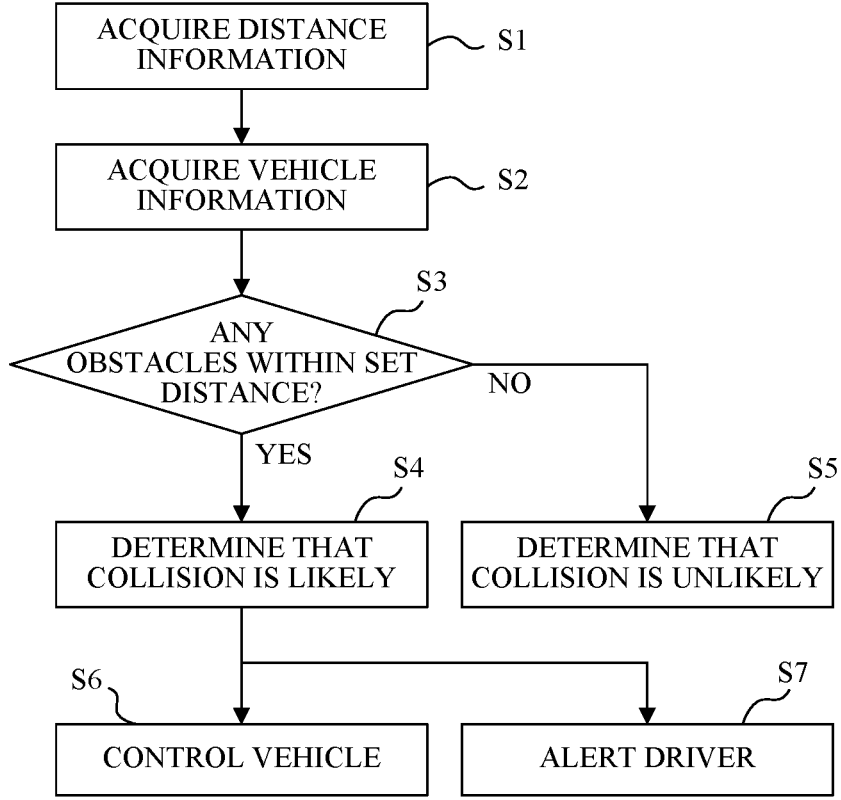
FIG. 13 is a flowchart illustrating an example of the operation of the on-board system according to this embodiment.

FIG. 13 is a flowchart showing an illustrative operation of the on-board system 1000 according to this embodiment. The operation of the on-board system 1000 will be described below with reference to this flowchart.

First, in step S1, the control unit acquires distance information to the object based on the signal output from the light receiving element by illuminating the object around the vehicle by the light source (light emitting element array 104) of the optical apparatus 1 and by receiving the reflected light from the object. In step S2, the vehicle information acquiring apparatus 200 acquires vehicle information including the vehicle speed, yaw rate, steering angle, and the like. Next, in step S3, the control unit determines whether the distance to the object falls within a range of the preset distance, using the distance information acquired in step S1 and the vehicle information acquired in step S2.

This configuration can determine whether or not the object exists within the set distance around the vehicle, and determine whether or not the collision between the vehicle and the object is likely. Steps S1 and S2 may be performed in the reverse order or in parallel. The control unit determines that "the collision is likely" in a case where the object exists within the set distance (step S4), and determines that "the collision is unlikely" in a case where the object does not exist within the set distance (step S5).

Next, in a case where the control unit determines that "the collision is likely," the control unit notifies (transmits) the determination result to the control apparatus 300 and the alert apparatus 400. Then, the control apparatus 300 controls the vehicle based on the determination result of the control unit (step S6), and the alert apparatus 400 alerts the vehicle user (driver) based on the determination result of the control unit (step S7). The notice of the determination result may be sent to at least one of the control apparatus 300 and the alert apparatus 400.

The control apparatus 300 can control a movement of the vehicle by outputting a control signal to the driving unit (engine, motor, etc.) of the vehicle. For example, a control signal is generated to apply a brake in the vehicle, to return an accelerator pedal, to turn a steering wheel, and to generating a braking force on each wheel, to suppress the output of the engine or the motor. The alert apparatus 400 alerts the driver by issuing an alert sound, by displaying alert information on a screen of a car navigation system, or by vibrating a seat belt or a steering wheel.

Thus, the on-board system 1000 according to this embodiment can detect the object and measure the distance by the above processing, and avoid the collision between the vehicle and the object. In particular, the optical apparatus 1 according to each of the above embodiments applied to the on-board system 1000 can measure the distance with high accuracy, and thus detect the object and determine the likelihood of the collision with high accuracy.

This embodiment applies the on-board system 1000 to the driving support (collision damage reduction), but is not limited to this example. The on-board system 1000 is applicable to the cruise control (including adaptive cruise control) and automatic driving. The on-board system 1000 is applicable not only to vehicles such as automobiles but also to moving bodies such as ships, aircrafts, and industrial robots. This embodiment is applicable not only to a moving object but also to various devices utilizing object recognitions such as an intelligent transportation system (ITS) and a surveillance system.

If the moving apparatus should collide with an obstacle, the on-board system 1000 or the moving apparatus may include a notifying apparatus or unit that notifies a manufacturer of the on-board system, a distributor of the moving apparatus, or the like of the collision. For example, the notifying apparatus may use a device that transmits information (collision information) on a collision between the moving apparatus and an obstacle to an external preset destination by e-mail or the like.

Due to the configuration in which the notifying apparatus automatically notifies the collision information, any measures can be promptly taken such as an inspection and a repair after the collision occurs. The destination of the collision information may be an insurance company, a medical institution, the police, or any other destination arbitrarily set by the user. The notifying apparatus may be configured to notify the destination of not only the collision information but also failure information about each part and consumption information about consumables. A collision may be detected using the distance information acquired based on the output from the above light receiver, or may be detected by another detector (sensor).

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can provide an optical apparatus that can improve the frame rate and SN ratio while reducing the influence of crosstalk from other pulsed light sources.

This application claims the benefit of Japanese Patent Application No. 2023-010750, filed on Jan. 27, 2023, which is hereby incorporated by reference herein in its entirety.

What is claimed is:

1. A control apparatus configured to control an optical apparatus that acquires distance information to an object and includes a light emitter configured to emit to the object pulsed light at a plurality of emission intervals set to be at unequal time intervals, and a light receiver configured to detect the pulsed light reflected by the object, the control apparatus comprising:

a memory storing instructions; and a processor configured to execute the instructions to:

acquire first measurement time from a first timing when the light receiver is set to a detectable state to a second timing when the light receiver detects the pulsed light, and second measurement time from a third timing when the light receiver is set to a detectable state to a fourth timing when the light receiver detects the pulsed light, and acquire flight time of the pulsed light from when the pulsed light is emitted to when the pulsed light is detected by the light receiver, wherein the processor is further configured to reset the light receiver at two different timings within one measurement cycle to obtain a first measurement time and a second measurement time, and to add first offsets to the first measurement time and second offsets, different from the first offsets, to the second measurement time, and wherein the processor acquires the flight time based on a plurality of first data obtained by adding a plurality of first offsets based on the plurality of emission intervals to the first measurement time, and a plurality of second data obtained by adding a plurality of second offsets based on the plurality of emission intervals to the second measurement time.

2. The control apparatus according to claim 1, wherein the processor acquires as the flight time the largest number of data among the plurality of first data and the plurality of second data.

3. The control apparatus according to claim 1, wherein the processor acquires the flight time using a histogram based on the plurality of first data and the plurality of second data.

4. The control apparatus according to claim 1, wherein the plurality of emission intervals are shorter than the flight time corresponding to a distance that can be acquired by the optical apparatus.

5. The control apparatus according to claim 1, wherein the processor acquires information including the plurality of emission intervals, the plurality of first offsets, and the plurality of second offsets.

6. The control apparatus according to claim 5, wherein the memory stores the information.

7. The control apparatus according to claim 5, wherein the plurality of emission intervals are generated at random.

8. The control apparatus according to claim 7, wherein the processor generates the plurality of first offsets and the plurality of second offsets using the plurality of emission intervals.

9. An optical apparatus comprising:

the control apparatus according to claim 1;

a light emitter configured to emit to the object pulsed light at a plurality of emission intervals set to be at unequal time intervals; and a light receiver configured to detect the pulsed light reflected from the object.

10. An optical system comprising a plurality of optical apparatuses according to claim 9, wherein information including the plurality of ejection intervals, the plurality of first offsets, and the plurality of second offsets is different for each optical apparatus.

11. An on-board system comprising:

the optical apparatus according to claim 9; and wherein the processor is further configured to execute computer instructions that cause the system to operate as:

a determining unit configured to determine whether a moving apparatus and the object are likely to collide with each other based on the distance information acquired by the optical apparatus.

12. The on-board system according to claim 11, further comprising a control unit configured to output a control signal that causes the moving apparatus to generate a braking force when it is determined that the moving apparatus and the object are likely to collide with each other.

13. The on-board system according to claim 11, further comprising an alert unit configured to alert a driver of the moving apparatus when it is determined that the moving apparatus and the object are likely to collide with each other.

14. The on-board system according to claim 11, further comprising a notifying unit configured to notify others about a collision between the moving apparatus and the object.

15. A moving apparatus comprising the optical apparatus according to claim 9, wherein the moving apparatus is movable while holding the optical apparatus.

16. The moving apparatus according to claim 15, further comprising a determining unit configured to determine whether the moving apparatus and the object are likely to collide with each other based on the distance information acquired by the optical apparatus.

17. The moving apparatus according to claim 16, further comprising a control unit configured to output a control signal that controls movement when it is determined that the moving apparatus and the object are likely to collide with each other.

18. The moving apparatus according to claim 16, further comprising an alert unit configured to alert a driver of the moving apparatus when it is determined that the moving apparatus and the object are likely to collide with each other.

19. A control method configured to control an optical apparatus that acquires distance information to an object and includes a light emitter configured to emit to the object pulsed light at a plurality of emission intervals set to be at unequal time intervals, and a light receiver configured to detect the pulsed light reflected by the object, the control method comprising:

a first step of acquiring first measurement time from a first timing when the light receiver is set to a detectable state to a second timing when the light receiver detects the pulsed light, and second measurement time from a third timing when the light receiver is set to a detectable state to a fourth timing when the light receiver detects the pulsed light, and a second step of acquiring flight time of the pulsed light from when the pulsed light is emitted to when the pulsed light is detected by the light receiver, a third step of resetting the light receiver at two different timings within one measurement cycle to obtain a first measurement time and a second measurement time, and to add first offsets to the first measurement time and second offsets, different from the first offsets, to the second measurement time, and wherein the second step acquires the flight time based on a plurality of first data obtained by adding a plurality of first offsets based on the plurality of emission intervals to the first measurement time, and a plurality of second data obtained by adding a plurality of second offsets based on the plurality of emission intervals to the second measurement time.

20. A non-transitory computer-readable storage medium storing a program that causes a computer to execute the control method according to claim 19.

* * * * *